United States Patent [19]

Hoefer et al.

[11] Patent Number: 5,271,855
[45] Date of Patent: Dec. 21, 1993

[54] USE OF METAL SOAPS OF POLYCARBOXYLIC ACIDS OR POLYCARBOXYLIC ACID PARTIAL ESTERS AS PROCESSING AIDS FOR POLYESTERS

[75] Inventors: Rainer Hoefer, Duesseldorf; Dieter Krampitz, Moenchengladbach; Andreas Lippmann, Duesseldorf, all of Fed. Rep. of Germany

[73] Assignee: Henkel Kommanditgesellschaft auf Aktien, Duesseldorf, Fed. Rep. of Germany

[21] Appl. No.: 946,296
[22] PCT Filed: Apr. 24, 1991
[86] PCT No.: PCT/EP91/00790
§ 371 Date: Nov. 2, 1992
§ 102(e) Date: Nov. 2, 1992
[87] PCT Pub. No.: WO91/17208
PCT Pub. Date: Nov. 14, 1991

[30] Foreign Application Priority Data

May 2, 1990 [DE] Fed. Rep. of Germany ....... 4014136

[51] Int. Cl.$^5$ .......................................... C10M 105/22
[52] U.S. Cl. ..................... 252/32; 528/272; 528/275; 528/277; 528/281; 528/308; 525/437; 525/444; 525/448; 252/35; 252/37.5; 252/108
[58] Field of Search ............... 528/272, 275, 277, 281, 528/302, 308; 525/437, 444, 448; 252/32, 35, 37.5, 108

[56] References Cited

U.S. PATENT DOCUMENTS

Re. 32,334  1/1987  Deyrup .................. 524/292
3,368,995   2/1968  Furukawa et al. ........ 524/381

FOREIGN PATENT DOCUMENTS

| | | |
|---|---|---|
| 214112 | 3/1987 | European Pat. Off. . |
| 262566 | 4/1988 | European Pat. Off. . |
| 1669704 | 3/1971 | Fed. Rep. of Germany . |
| 1921010 | 2/1979 | Fed. Rep. of Germany . |
| 1361439 | 4/1964 | France . |
| 53-00774 | 1/1978 | Japan . |
| 6515106 | 2/1967 | Netherlands . |
| 6608999 | 2/1967 | Netherlands . |
| 1010043 | 11/1965 | United Kingdom . |
| 1117139 | 6/1968 | United Kingdom . |
| 1261369 | 1/1972 | United Kingdom . |

OTHER PUBLICATIONS

Chemische Technologie, 4th ed., vol. 6, Carl Hanser Verlag, 1982.
Kunststoffe, K. D. Asmus, 59, 266, 1969.
Kunststoffe, R. Pflueger, 57, 31, 1967.
Eastman Kunststoffe, Publications MB-82B, TR-61C & PTP-258 DIN 53 375-A.
Trademarks-LOXIOL EP-2 & EP-728.

*Primary Examiner*—Morton Foelak
*Assistant Examiner*—Sam A. Acquah
*Attorney, Agent, or Firm*—Wayne C. Jaeschke; Norvell E. Wisdom, Jr.; Daniel S. Ortiz

[57] ABSTRACT

The invention is a processing aid for thermoplastic polyesters which is a salt of a polycarboxylic acid or the salt of a polycarboxylic partial ester. The polycarboxylic acids are partial esters or sales of modified acids such as succinic acid, adipic acid, phthalic acid, citric acid, dicarboxylphenyl group and the like. The addition of the processing aid improves the slip and transparency.

6 Claims, No Drawings

USE OF METAL SOAPS OF POLYCARBOXYLIC ACIDS OR POLYCARBOXYLIC ACID PARTIAL ESTERS AS PROCESSING AIDS FOR POLYESTERS

BACKGROUND OF THE INVENTION

This invention relates to the use of metal soaps of polycarboxylic acids or polycarboxylic acid partial esters corresponding to general formula I $$A-O-CO-X-CO-O-B \quad (I)$$

in which

A and B together represent a metal ion from the group consisting of $Mg^{2+}$, $Ca^{2+}$ and $Zn^{2+}$ or A is alkyl or alkenyl containing 10 to 22 carbon atoms and B represents an equivalent of the metal ions from the group consisting of $Mg^{2+}$, $Ca^{2+}$ and $Zn^{2+}$ and X is an o-phenylene group, a group corresponding to general formula II $$-CH(R^1)-CH(R^2)- \quad (II)$$

in which $R^1$ and $R^2$ are selected from the group consisting of hydrogen, alkyl or alkenyl containing 10 to 22 carbon atoms and hydroxy, a group corresponding to general formula III $$-(CH_2)_n- \quad (III)$$

in which n is the number 3 or 4, or a group corresponding to general formula IV $$-CH_2-C(OH)(COOR^3)-CH_2- \quad (IV)$$

in which $R^3$ represents alkyl or alkenyl containing 10 to 22 carbon atoms or an equivalent of the metal ions from the group consisting of $Mg^{3+}$, $Ca^{2+}$ and $Zn^{2+}$, with the provisos that A is alkyl or alkenyl containing 10 to 22 carbon atoms and B is an equivalent of the metal ions from the group consisting of $Mg^{2+}$, $Ca^{2+}$ and $Zn^{2+}$ where X is an o-phenylene group or a group corresponding to general formula II with $R^1$ and $R^2$=hydrogen and/or hydroxy or X is a group corresponding to general formula III or IV and A and B together form a metal ion from the group consisting of $Mg^{2+}$, $Ca^{2+}$ and $Zn^{2+}$ where X is a group corresponding to general formula II in which at least one of the substituents $R^1$ and $R^2$ is alkyl or alkenyl containing 10 to 22 carbon atoms, as processing aids for polyesters.

FIELD OF THE INVENTION

The present invention also relates to a process for the production of polyester compounds, more particularly polyester films, based on polyalkylene terephthalates having improved properties in regard to slip behavior and/or transparency using the above-mentioned metal soaps of polycarboxylic acids or polycarboxylic acid partial esters.

Linear polyesters are obtained by esterification of diols with dicarboxylic acids or derivatives thereof. By virtue of their low melting points, linear aliphatic polyesters have acquired a certain significance as soft resins and non-volatile polymer plasticizers. In addition, they are used as starting materials for the production of polyurethane elastomers and foams. By contrast, high molecular weight linear, aromatic/aliphatic polyesters are high-melting products of which the most important representative, polyethylene terephthalate, plays a major role in the field of fibers and films. Although these products have been known as raw materials for fibers since 1941 (see H. Sattler, "Chemiefasern" in Winnacker, Küchler "Chemische Technologie", 4th Edition, Vol. 6, Organische Technologie II, Carl Hanser Verlag, München, 1982), it was not until the middle of the 60s that these products were successfully converted into moldings having valuable properties by thermoplastic processing (cf. K.D. Asmus, D. Niedenberg, H. Schell "Kunststoffe" 59, 266 (1969) and R. Pflüger "Kunststoffe" 57, 31 (1967)). It is necessary in these processes to maintain defined processing conditions and, in many cases, to use so-called nucleating agents to accelerate crystallization and to produce an optimal crystallite size in the moldings.

Among the thermoplastic polyesters, polyethylene terephthalate (PETP) and polybutylene terephthalate (PBTP) have hitherto acquired fairly considerable significance. Polyalkylene terephthalates have high impact strength; they are very hard, rigid, abrasion-resistant and dimensionally stable. In addition, they show good solvent resistance and weathering resistance coupled with excellent electrical properties. Although the particle crystalline products have acquired the greater significance in applicational terms, copolyesters of terephthalic acid or of isophthalic acids and dihydric alcohols, for example 1,4-dimethylol cyclohexane and neopentyl glycol, are assuming increasing significance by virtue of the absence of any tendency towards crystallization and the resulting transparency, above all as (co)-extruded films having excellent barrier properties in the packaging field for blister packs, protective films, thermoformed containers and assortment boxes for foods and also in the injection molding field for toys, apparatus components, display articles and the like, cf. Eastman Kunststoffe, Publications Nos. MB-82B, TR-61C, pTp-25B.

RELATED ART

Various processing aids are known for thermoplastic polyesters, including for example glass fibers for improving dimensional stability and for obtaining greater hardness (U.S. Pat. No. 3,368,995, FR-PS 1,361,439, GB-PS 1,010,043), nonyl phthalate (NL-OS 6,608,999, 6,515,106) and co-condensed phthalimidoesters (EP-PS 214,112).

In addition, known mold release agents for the injection molding of polyalkylene terephthalates are paraffin waxes, polyethylene waxes or oxidized polyethylenes produced by oxidation of high-density or low-density polyethylene with air which have been described as mold release agents for polycarbonate/polyalkylene terephthalate blends (see, for example, EP-PS 262,566). However, these products are attended by the disadvantage that they lead to serious hazing so that they cannot be used in transparent articles.

DE-OS 1,921,010 describes esters of long-chain organic acids with 1- to 10-hydric alcohols, for example pentaerythritol tetrastearate or methyl stearate, either on their own or in combination with sodium stearate for improving the processing properties of polyesters. These compounds are capable of improving the surface properties of the polyesters and, as internal mold release agents, of promoting easy removal of moldings produced from these polyesters from the molds. Certain fatty alcohols and fatty acid esters of polyhydric alcohols on their own or in combination with fatty acid soaps of divalent metal ions, for example zinc behenate, and/or amorphous gel or precipitated silica are effective as denesting agents for thermoformed plastic articles, for example assortment boxes, more particularly for articles of thermoformed polyester films; typical examples are the products marketed under the trademarks LOXIOL® EP 2 (metal-soap-containing mixed lubricant) and LOXIOL® EP 728 (polyol partial ester).

The problem addressed by the present invention was to provide new processing aids for polyesters which would be capable of improving the processability, for example the slip behavior and/or the transparency, of polyester molding compounds, more particularly non-crystalline co-polyester films, for example PETG polyesters. Films of the type in question are often so smooth and flexible that they adhere to machine surfaces or, for example stacked one on top of the other as bags or as thermoformed moldings, adhere strongly to one another. Accordingly, they can no longer be lifted off one another or opened and thus interfere with or prevent the filling of the containers and their transport on packaging lines. In addition, the new processing aids to be provided by the invention would be compatible with the polyesters and would provide for high transparency of the moldings produced from the polyesters. This problem has been solved by the use of the metal soaps of polycarboxylic acids or polycarboxylic acid partial esters mentioned at the beginning.

BRIEF SUMMARY OF THE INVENTION

The characteristic feature of the metal soaps to be used in accordance with the invention is that the polycarboxylic acids on which they are based and which may contain 2 or 3 carboxyl groups have at least one longchain, linear or branched, more particularly linear, alkyl or alkenyl group containing 10 to 22 carbon atoms which is attached to the polycarboxylic acid through a C-C or C-O bond; the carboxyl groups remaining free are present as magnesium, calcium and/or zinc carboxylates.

Typical examples of the above-mentioned alkyl or alkenyl groups containing 10 to 22 carbon atoms are decyl, undecyl, dodecyl, tetradecyl, hexadecyl, octadecyl, eicosyl and docosyl groups and also decenyl, undecenyl, dodecenyl, tetradecenyl, hexadecenyl, octadecenyl, eisosenyl and docosenyl groups. Technical mixtures of metal soaps, in which various alkyl or alkenyl groups within the chain length range mentioned are present, may also be used.

If, in the metal soaps corresponding to general formula I, X is an o-phenylene group, the metal soaps are derived from a semiester of phthalic acid of which one carboxyl group is esterified with a compound A-OH, A being an alkyl or alkenyl group containing 10 to 22 carbon atoms, and of which the second carboxyl group is present as Mg, Ca and/or Zn carboxylate.

If, in the metal soaps corresponding to general formula I, X is a group corresponding to general formula II, the dicarboxylic acids on which they are based are derived from succinic acid, alkylated or alkenylated succinic acid or from hydroxycarboxylic acids, such as malic acid or tartaric acid. If the basic dicarboxylic acid contains an alkyl or alkenyl substituent attached by a C-C bond, both carboxyl groups are present as metal carboxylates. If the basic dicarboxylic acid contains the alkyl or alkenyl group via an ester bond, it is present as a semiester of which the free carboxyl group is converted into a metal carboxylate.

If the metal soaps correspond to general formula I, in which X is a group corresponding to general formula III, the basic dicarboxylic acid is glutaric acid or adipic acid which, in turn, contains the alkyl or alkenyl group via an ester bond and of which the free carboxyl groups are present as metal carboxylates.

If, in the metal soaps corresponding to general formula I, X is a group corresponding to general formula VI, the basic polycarboxylic acid is citric acid. In 1 or 2 of the carboxyl groups, the alkyl or alkenyl groups are attached by an ester bond, the remaining carboxyl groups being present as metal carboxylates.

In one advantageous embodiment of the invention, the metal soaps correspond to general formula V

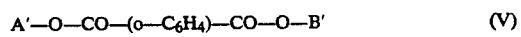

$$A'-O-CO-(o-C_6H_4)-CO-O-B' \qquad (V)$$

in which
A' is linear alkyl or alkenyl containing 10 to 22 carbon atoms and
B' is an equivalent of the metal ions from the group consisting of $Mg^{2+}$, $Ca^{2+}$ and $Zn^{2+}$.

In another advantageous embodiment of the invention, the metal soaps correspond to general formula VI

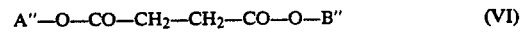

$$A''-O-CO-CH_2-CH_2-CO-O-B'' \qquad (VI)$$

in which
A'' is linear alkyl or alkenyl containing 10 to 22 carbon atoms and
B'' is an equivalent of the metal ions from the group consisting of $Mg^{2+}$, $Ca^{2+}$ and $Zn^{2+}$.

In another advantageous embodiment of the invention, the metal soaps correspond to general formula VII

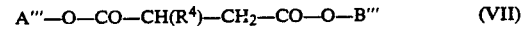

$$A'''-O-CO-CH(R^4)-CH_2-CO-O-B''' \qquad (VII)$$

in which
A''' and B''' together represent a metal ion from the group consisting of $Mg^{2+}$, $Ca^{2+}$ and $Zn^{2+}$ and $R^4$ represents linear alkyl or alkenyl containing 10 to 22 carbon atoms.

In another advantageous embodiment of the invention, the metal soaps correspond to general formula VIII

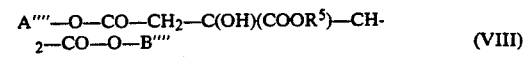

$$A''''-O-CO-CH_2-C(OH)(COOR^5)-CH_2-CO-O-B'''' \qquad (VIII)$$

in which
A'''' and B'''' together represent a metal ion from the group consisting of $Mg^{2+}$, $Ca^{2+}$ and $Zn^{2+}$ and $R^5$ represents linear alkyl or alkenyl containing 10 to 22 carbon atoms.

In another advantageous embodiment of the invention, the metal soaps are used in a quantity of 0.01 to 3% by weight and more preferably in a quantity of 0.1 to 2% by weight, based on the weight of the polyester.

The present invention also relates to a process for the production of polyester compounds, more particularly polyester films, based on polyalkylene terephthalates having improved properties in regard to slip behavior and/or transparency using the metal soaps mentioned above.

DETAILED DESCRIPTION OF THE INVENTION

The metal soaps to be used in accordance with the invention may be obtained by known methods. Their production is described in the following Examples. Where the metal soaps are derived from partial esters of polycarboxylic acids, it has proved to be harmless so far as their suitability as processing aids is concerned and, in some cases, favorable so far as their production is concerned (i.e. for obtaining a relatively low viscosity of the reaction mixtures) if they contain up to 30 mol-% of the corresponding full esters.

The invention is illustrated by the following Examples.

A. Production of metal soaps corresponding to general formula I to be used in accordance with the invention a) Calcium stearyl succinate 696.4 g of a commercially available technical stearyl alcohol were introduced into a reaction vessel and heated to 80° C. 256.6 g succinic anhydride were then added; the reaction mixture was heated to 130° C. The reaction was mildly exothermic; the temperature rose to 140° C. The reaction mixture was then stirred for 30 minutes at 130 to 140° C.; the acid value of the reaction mixture was 151 to 152. 94.3 g plus 2.8 g (3% excess) calcium hydroxide Were then introduced in portions over a period of 30 minutes at temperatures of 145° to 150° C. The reaction mixture was kept at that temperature for 4 hours, a light vacuum being applied at the beginning of the reaction. The vacuum was increased to 500 hPa after 30 minutes, to 32 hPa after 1 h and 39 hPa after 2 h and was left at that value until the end of the 4-hour reaction time.

A grey-tinged yellowish, low-viscosity melt was obtained.

The reaction mixture had the following consistency after cooling:
Yellowish solid resembling hard wax;
Pour/solidification point approx. 90° C.
Calcium content 5.1%
Acid value approx. 15 to 20.

b) Calcium stearyl succinate (with 10 mol-% distearyl succinate)

These metal soaps were obtained in the same as described in a), except that excess of 10 mol-% stearyl alcohol was used; the addition of calcium hydroxide was reduced accordingly.

c) Calcium stearyl adipate (with 20 mol-% distearyl adipate)

146.0 g (1.0 mol) adipic acid were esterified with 312.0 g (1.2 mol) of a tallow fatty alcohol (commercially available technical product with an iodine value of <1, a hydroxyl value of 210 to 220 and a number average molecular weight of approx. 260) in the presence of 0.02 mol-% tin oxalate as catalyst; the reaction temperature was 170 to 180° C., the reaction time was approx. 2 h. A light vacuum was applied at the beginning of the reaction, being adjusted to 100 hPa towards the end of the reaction. The acid value of the reaction mixture on completion of the reaction was approx. 100 to 105.

31.1 g (0.4 mol+5% excess) calcium hydroxide were introduced in portions into the reaction mixture cooled to 150° C. The addition had to be made slowly on account of foaming. The reaction mixture was then left to react in vacuo for 1 h at 150° to 160° C., after which the acid value was approx. 6 to 10. A yellowish, milky, low-viscosity melt having a calcium content of 3.6 to 3.8% was obtained. The product solidified on cooling and had a pour/solidification point of 120° C.

d) Calcium stearyl phthalate 148.0 g (1.0 mol) phthalic anhydride and 270.0 g (1.0 mol) of a technical stearyl alcohol were melted in a glass beaker and stirred for 30 minutes at 130° C. A clear yellowish melt was obtained and solidified on cooling. The product had a dropping point of 68° C., an acid value of approx. 135 and a saponification value of approx. 270.

1000 ml deionized water, 39.0 g (0.5 mol+5% excess) calcium hydroxide and 8.7 g acetic acid (catalyst) were introduced into a glass beaker. The powder-form product obtained beforehand was then added. The reaction temperature was increased hourly by 10° to 15° C. to 75° C. The reaction mixture was then stirred at that temperature for 2 h, during which is was repeatedly homogenized with a disperser.

A light, hydrophobic powder-form deposit was obtained and was filtered under suction on a porcelain nutsch filter and washed three times with deionized water. The filter cake was spread out on a filter paper and dried in a drying cabinet at 80° to 90° C. to constant weight. A light, powderform product having a solidification point of 150° to 155° C. and a calcium content of 4.6% was obtained.

e) Calcium dodecenyl succinate

A solution of 313.5 g (1.98 mol) calcium acetate in 1000 ml water was added to a solution of 570 g (1.98 mol) dodecenyl succinic anhydride in 1000 ml isopropanol. The mixture was then heated to 90° C., left at that temperature for 1.5 h and then concentrated in a water jet vacuum. The residue was dried in vacuo in a drying cabinet at 100° C. 680 g of the calcium soap were obtained in the form of a colorless powder.

f) Magnesium dodecenyl succinate

The procedure described in e) using magnesium acetate gave the corresponding magnesium soap.

g) Zinc dodecenyl succinate

The procedure described in e) using zinc acetate gave the corresponding zinc soap.

h) Zinc hexadecenyl succinate

A solution of 47.08 g (2.14 mol) zinc acetate in 396 ml water was slowly added to 81.84 g (0.214 mol) hexadecenyl succinic acid dissolved in 660 ml acetone. The mixture was heated under reflux for 30 minutes. The acetone was distilled off. After the addition of 350 ml water, the mixture was heated for 15 minutes to 95° C. The solid was filtered off; the moist filter cake was boiled for 30 minutes in 650 ml acetone. After filtration under suction, the solid was dried.

103.7 g of the zinc soap were obtained in the form of a colorless powder. Zinc content: found 15.6%, calculated 14.7%.

i) Magnesium hexadecenyl succinate

The procedure described in h) using magnesium acetate gave the corresponding magnesium soap.

k) Calcium hexadecenyl succinate

The procedure described in h) using calcium acetate gave the corresponding calcium soap.

l) Zinc stearyl monocitrate 114 g (0.59 mol) citric acid and 167.5 g (0.589 mol) stearyl alcohol were heated to 113° C. in 300 ml 1,4-dioxane. A mixture of water and dioxane distilled over at that temperature. Towards the end of the reaction, the temperature was slowly increased to 140° C. and the acetone was distilled off. The colorless wax-like residue (311.8 g) obtained did not contain any free stearyl alcohol detectable by thin-layer chromatography. The product had an acid value of 208, a saponification value of 333 and a hydroxyl value of 209.

278.2 g (0.513 mol) stearyl monocitrate were dissolved in 650 ml acetone and 123.9 g (0.565 mol) zinc acetate in 650 ml water. The solutions were combined and were stirred for 1 hour at a temperature slightly above room temperature. The acetone was then distilled off under normal pressure. 500 ml water were added to the warm residue. After cooling to room temperature, the residue was filtered off under suction and digested while heating with 700 ml acetone. It was then filtered off under suction again and dried in vacuo.

271.8 g (87.5% of the theoretical) of the zinc soap were obtained in the form of a colorless powder.

Elemental analysis:
Calculated: C 57.6%, H 7.0%, Zn 13.0%.
Found: C 56.2%, H 8.6%, Zn 12.0%.

m) Calcium stearyl monocitrate 290.8 g (0.5 mol) stearyl monocitrate (obtained as described in 1) were dissolved in 650 ml acetone and 88 g (0.5 mol) calcium acetate were dissolved in 650 ml water. The two solutions were combined and treated as described in 1). 278.3 g (88.6% of the theoretical) of the calcium soap were obtained in the form of a colorless powder. Elemental analysis:
Calculated: C 60.6%, H 7.4%, Ca 8.1%.
Found: C 58.4%, H 8.9%, Ca 7.3.

n) Zinc dodeoyl monocitrate 290 g (1.5 mol) citric acid and 283.6 g (1.5 mol) dodecanol were heated to 119° C. in 600 ml 1,4-dioxane, a mixture of water and dioxane distilling over. After approx. 2 h, the temperature was slowly increased to 140° C., the dioxane being completely distilled off. 671.3 g of a light yellowish oil having an acid value of 257, a saponification value of 426 and a hydroxyl value of 244 were obtained.

310 g (0.62 mol) of the dodecyl monocitrate thus obtained were dissolved in 650 ml acetone and 150.4 g (0.68 mol) zinc acetate were dissolved in 650 ml water. The two solutions were combined; the reaction mixture was further treated as described in 1). A residue having the following elemental analysis was obtained after drying:
Calculated: C 51.0%, H 7.1%, Zn 15.4%.
Found: C 46.4%, H 6.7%, Zn 17.0%.

o) Calcium dodecyl monocitrate

The procedure described in n) using 109.5 g (0.62 mol) calcium acetate instead of zinc acetate gave 257.5 g of the calcium soap in the form of a colorless powder having the following elemental analysis:
Calculated: C 55.2%, H 5.9%, Ca 10.2%.
Found: C 51.9%, H 7.6%, Ca 9.2%.

B. Production of mixtures of polyesters and metal soaps to be used in accordance with the invention The polyester used was a commercially available glassclear, amorphous polymer having a glass transition temperature of approx. 81° C. and a number average molecular weight of approx. 26,000 (KODAR® PETG Copolyester 6763, a product of Eastman Chemical products, Inc., Kingsport, Tenn., U.S.A.).

Where they had melting points below 90° C., the metal soaps to be used in accordance with the invention were applied to the granulated PETG polyester in a Henschel fluid mixer at low speeds (approx. 1000 r.p.m.) and at temperatures of approx. 80° C. The mixture was removed from the mixer while still hot. In the case of products having relatively high melting ranges, the metal soaps were distributed by tumbling in a polyethylene bag.

The metal soaps were then homogeneously incorporated in a Collin type 235 twin-screw kneader (50×15 D) with a K-Tron T 20 twin metering screw and an integrated water cooling bath and a rotary strand granulator. The extrusion temperatures were between 230° and 235° C. and the screw speed was 70 r.p.m. The granules obtained were dried for at least 8 hours at 75° C.

C. Testing of the polyester/metal soap mixtures

1. Slip effect

The slip effect was determined by a test according to DIN 53 375 (determination of friction behavior). The films required for this purpose were produced in a Brabender film blowing machine consisting of a Plasticorder PLE 651, an extrusiograph (30×25 D) and a blowing head (nozzle diameter 50 mm) and a take-off unit comprising a pneumatic control box, a roller assembly and automatic width control.

Extrusion parameters:
Cylinder temperatures: 180° to 205° C.
Dye temperatures: 210° C.
Screw speed: 40 r.p.m.
Take-off roller speed: 6 to 7 m/minute.

For measuring friction, approx. 8×12 cm pieces were cut out from the blown films obtained. The inner surfaces of the film were kept apart by paper and were subsequently stored in the test atmosphere (approx. 50% relative air humidity and room temperature).

The friction measurements were carried out in accordance with DIN 53 375-A (film-to-film) using an RPF friction tester with an electronic force measuring instrument (manufacturer: Wazau) both immediately after production of the films and after 24 h, 2 to 3 days and 1 week (inside measured, triple determination).

The sliding friction coefficient $\mu_D$ is calculated in accordance with the equation $\mu_K = F_D/F_N$ where $F_D$ is the sliding friction force in N and $F_N$ is the normal force in N.

The results are set out in the Table. Where the sliding friction coefficient is shown in the Table, uniform sliding was in evidence in every case. Where the letter "o" appears, an improvement is obtained in the slip effect, but the sliding friction coefficient cannot be cited because of excessive variations (attributable to high static friction). The symbol "—" denotes that there was no discernible improvement in the slip effect.

2. Flow behavior

Flow behavior was determined (lubricant test) using a Mannesmann Demag DNC-120 injection molding machine and a spiral mold.

| Injection molding parameters: | |
| --- | --- |
| Cylinder equipment: | Open nozzle, screw diameter = 45 mm, with non-return valve |
| Cylinder temperatures: | 230–250° C. |
| Nozzle temperature: | 260° C. |
| Screw speed: | Setting 16 |
| Injection pressure: | 31 |
| Follow-up pressure: | 16 |
| Screw back pressure | 4 |
| Injection speed: | 4 |
| Nozzle contact pressure: | 9 |
| Locking force: | 1000 kN |

-continued

| Injection molding parameters: | |
|---|---|
| Injection time: | 5.0 s |
| Follow-up time: | 2.0 s |
| Change-over time: | 2.0 s |
| Cooling time: | 15.0 s |
| Feed delay time: | 0.5 s |
| Nozzle back time: | 2.0 s |
| Metering stroke: | 37 mm |
| Decompression: | 39 mm |
| Mold: | Spiral mold, 3 × 15 mm right-angle deflection |
| Mold temperature: | Water-cooled |

| Sprue: | Gate |
|---|---|

The length of the injected spirals was used as a measure of the lubricant effect of the additive.

3. Transparency retention

Transparency was evaluated with an instrument of the Lange type (UME 3 universal measuring unit and LT 12 transparency measuring head). The injected spirals (thickness: 3 mm) were used as test specimens. Since the spiral did not completely cover the measuring surface of the LT 12, this surface was reduced by a mask to 1.6×1.6 cm. No spectral filters were used for the measurement. The standard setting (=100% permeability to light) was based on the zero sample (Kodar PETG-6763, without additive).

4. Extrusion behavior

Extrusion behavior was evaluated during film blowing because the Plasticorder PLE 651 drive unit is equipped with a torque indicator.

The torque data shown in the Table correspond to the following torque ranges:
Low <220 Nm
Medium 220 to 280 nM
High >280 Nm In general, a low melt pressure resulted from a low torque, etc.

5. Influencing color

Color was visually evaluated from the injected spirals.

Characterization
+ No discernible discoloration by the additive
o Slight discoloration, for example bluish in the case of Ca soaps.

The tests show that the metal soaps to be used in accordance with the invention have good denesting properties and/or transparency-retaining properties and/or minimal influences on the color of the modified polyesters.

TABLE

| Metal soap | Dosage (in % by weight) | Slip behavior Sliding friction coefficient $\mu_D$ | | | | Flow behavior Spiral length (in cm) | Transparency Permeability to light (in %) | Extrusion behavior Torque | Color evaluation |
|---|---|---|---|---|---|---|---|---|---|
| | | Immediately | 24 h | 3 d | 7 d | | | | |
| No addition | — | — | — | — | — | 53.0 | 100 | High | + |
| a | 0.9 | 0.6 | 0.4 | 0.4 | 0.4 | 56.5 | 95 | Medium | +/o |
| a | 0.9 | 0.5 | 0.4 | 0.4 | 0.4 | 56.5 | 94 | Medium | +/o |
| a | 0.3 | — | 0.6* | 0.7* | 0.6* | n.d. | 100 | High | +/o |
| | 0.5 | 1.2* | 0.4 | 0.4 | 0.4 | n.d. | 100 | High | +/o |
| | 0.7 | 1.0* | 0.4 | 0.45 | 0.45 | n.d. | 99 | Medium | +/o |
| | 0.9 | 0.5 | 0.4 | 0.4 | 0.4 | n.d. | 97 | Medium | +/o |
| a[1] | 0.9 | 1.0* | 0.4 | 0.4 | 0.4 | 60.5 | 100 | Medium | +/o |
| b | 0.9 | 0.9 | 0.5 | 0.5 | 0.5 | 60.5 | 94 | Medium | +/o |
| c | 0.5 | o | 0.4 | 0.5 | 0.4 | 51.5 | 97 | High | +/o |
| | 1.0 | 0.9* | 0.4 | 0.4 | 0.4 | 67.5 | 93 | Medium | o |
| k | 0.15 | 1.5* | 0.6 | 0.6 | 0.6 | 52.5 | 67 | High | +/o |
| o | 0.15 | 1.2* | 0.7 | 0.6 | 0.6 | 50.5 | 95 | Medium | + |
| | 0.5 | 0.9 | 0.6 | 0.6 | 0.65 | 56.5 | 75 | Low | + |
| | 1.0 | 0.7 | 0.7 | 0.75 | 0.7 | 54.5 | 51 | Low | + |
| m | 0.15 | — | 0.7* | 0.7* | 0.7* | 56.0 | 100 | High | + |
| | 0.5 | o | 0.6 | 0.6 | 0.5 | 53.0 | 96 | Medium | + |
| | 1.0 | >2* | 0.6 | 0.6 | 0.6 | 51.5 | 84 | Low | + |
| n | 0.5 | 0.9 | 0.8 | 0.8 | 0.8 | 54.5 | 84 | Low | + |
| l | 0.5 | 0.75 | 0.6 | 0.6 | 0.5 | 54.5 | 89 | Low | + |
| d | 1.0 | — | 0.7 | 0.8 | 0.6 | n.d. | 92 | n.d. | + |
| | 1.5 | 0.7 | 0.6 | 0.7 | 0.7 | n.d. | 86 | n.d. | +/o |
| g | 0.5 | o | 1.0 | 1.0 | 0.9 | n.d. | 98 | | +/o |
| h | 0.5 | 0.9 | 0.8 | 0.8 | 0.7 | n.d. | 56 | n.d. | +/o |
| e | 0.5 | 1.1 | 0.9 | 0.9 | 0.9 | n.d. | 50 | n.d. | + |

*No uniform sliding of the film surfaces (strong static friction)
n.d. = Not determined: [1])purified by dissolution in and reprecipitation from ethyl acetate and petroleum ether

We claim:

1. A processing aid for thermoplastic polyesters which comprises a metal soap of a polycarboxylic acid or polycarboxylic acid partial ester of the formula $$A-O-CO-X-CO-O-B \quad (I)$$

in which
A and B together represent a metal ion selected from the group consisting of $Mg^{2+}$, $Ca^{2+}$ and $Zn^{2+}$, or
A is alkyl containing 10 to 22 carbon atoms or alkenyl containing 10 to 22 carbon atoms and B is an equivalent of a metal selected from the group consisting of $Mg^{2+}$, $Ca^{2+}$ and $Zn^{2+}$ and
X is a member selected from the group consisting of an o-phenylene group, a group of the formula $$-CH(R^1)-CH(R^2)- \quad (II)$$

in which
$R^1$ and $R^2$ are independently selected from the group consisting of hydrogen, alkyl containing 10 to 22 carbon atoms, alkenyl containing 10 to 22 carbon atoms and hydroxy,
a group of the formula $$-(CH_2)_n- \quad (III)$$

in which n is the number 3 or 4 or a group of the formula $$-CH_2-C(OH)(COOR^3)-CH_2-\quad\text{(IV)}$$

in which
R³ represents alkyl containing 10 to 22 carbon atoms, alkenyl containing 10 to 22 carbon atoms or an equivalent of a metal ion selected from the group consisting of Mg²⁺, Ca²⁺ and Zn²⁺, with the provisos that A is alkyl containing 10 to 22 carbon atoms or alkenyl containing 10 to 22 carbon atoms and B is an equivalent of a metal ion selected from the group consisting of Mg²⁺, Ca²⁺ and Zn²⁺ when X is an o-phenylene group or a group of the formula (II) and R¹ and R² are independently hydrogen or hydroxy or X is a group of the formula (III) or (IV), or A and B together form a metal ion selected from the group consisting of Mg²⁺, Ca²⁺ and Zn²⁺ when X is a group of the formula (II) in which at least one of the substituents R¹ and R² is alkyl containing 10 to 22 carbon atoms or alkenyl containing 10 to 22 carbon atoms.

2. A processing aid of claim 1, comprising a metal soap of the formula $$A'-O-CO-(o-C_6H_4)-CO-O-B'\quad\text{(V)}$$

in which
A' is a linear alkyl group containing 10 to 22 carbon atoms or linear alkenyl group containing 10 to 22 carbon atoms and
B' is an equivalent of a metal ion selected from the group consisting of Mg²⁺, Ca²⁺ and Zn²⁺.

3. A processing aid of claim 1, comprising a metal soap of the formula $$A''-O-CO-CH_2-CH_2-CO-O-B''\quad\text{(VI)}$$

in which
A'' is a linear alkyl group containing 10 to 22 carbon atoms or a linear alkenyl group containing 10 to 22 carbon atoms and
B'' is an equivalent of a metal ion selected from the group consisting of Mg²⁺, Ca²⁺ and Zn²⁺.

4. A processing aid of claim 1, comprising a metal soap of the formula $$A'''-O-CO-CH(R^4)-CH_2-CO-O-B'''\quad\text{(VII)}$$

in which
A''' and B''' together represent a metal ion selected from the group consisting of Mg²⁺, Ca²⁺ and Zn²⁺ and R⁴ represents a linear alkyl group containing 10 to 22 carbon atoms or a linear alkenyl group containing 10 to 22 carbon atoms.

5. A processing aid of claim 1, comprising a metal soap of the formula $$A''''-O-CO-CH_2-C(OH)(COOR^5)-CH_2-CO-O-B''''\quad\text{(VIII)}$$

in which
A'''' and B'''' together represent a metal ion selected from the group consisting of Mg²⁺, Ca²⁺ and Zn²⁺ and R⁵ represents a linear alkyl group containing 10 to 22 carbon atoms or a linear alkenyl group containing 10 to 22 carbon atoms.

6. A thermoplastic polyester containing 0.01 to 3% by weight of the polyester of a processing aid of claim 1.

* * * * *